March 15, 1938. F. WEST, JR 2,111,442
NAVIGATING TELEMETERING SYSTEM
Filed April 17, 1937 3 Sheets-Sheet 3
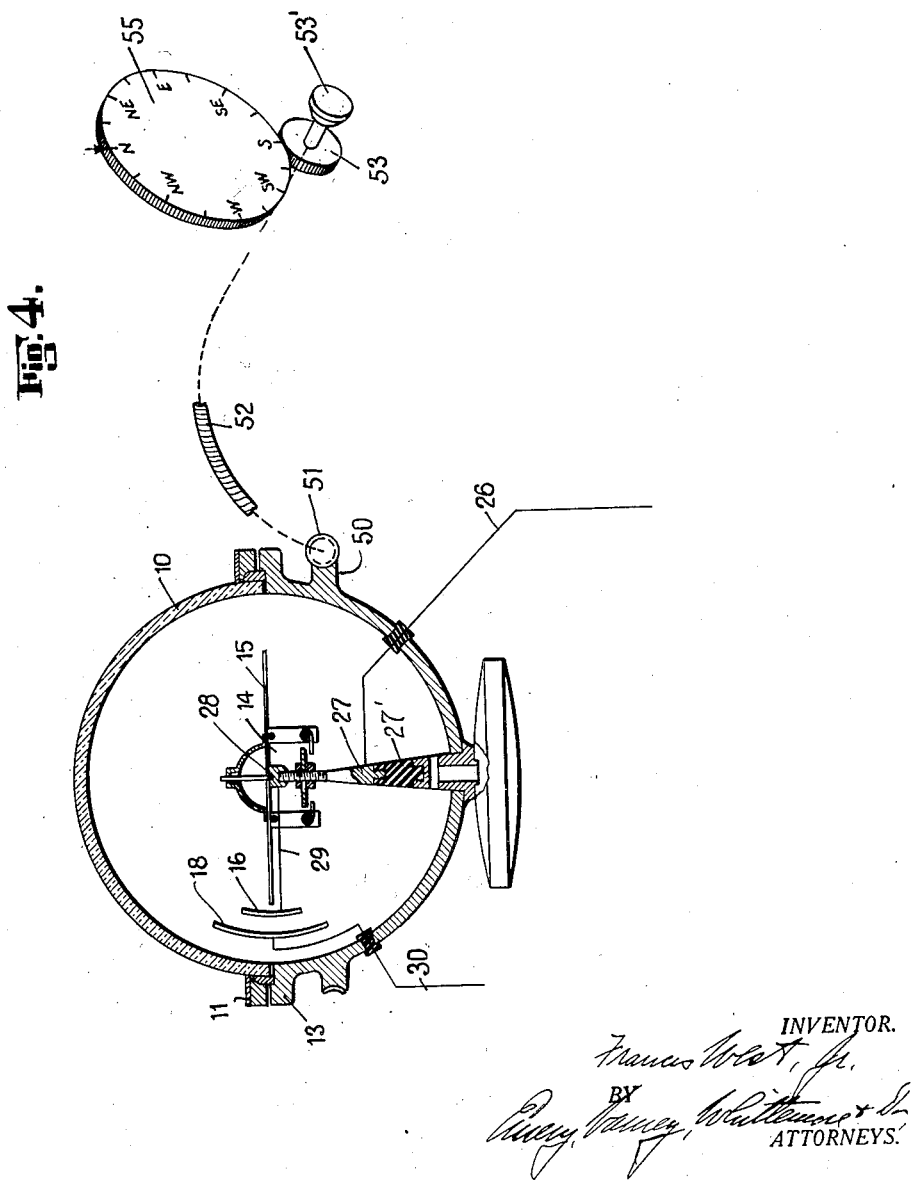

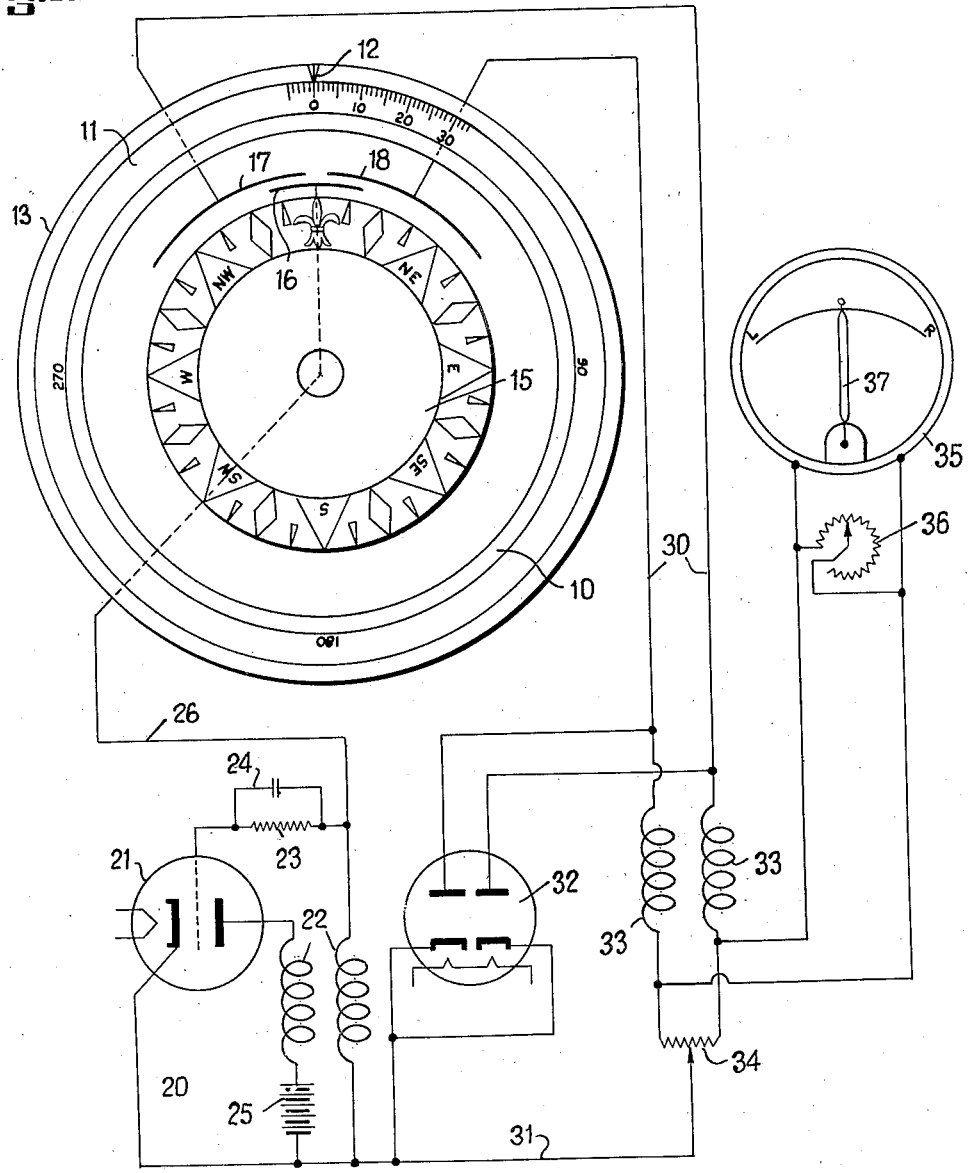

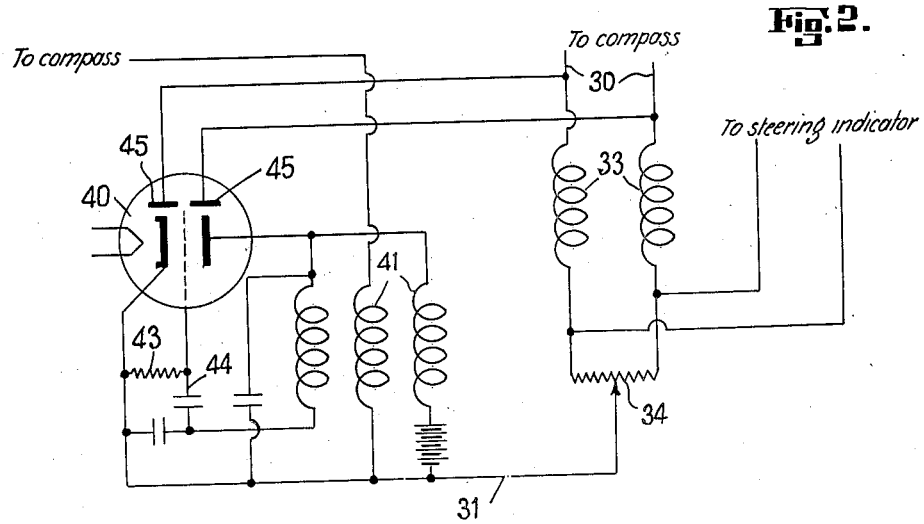
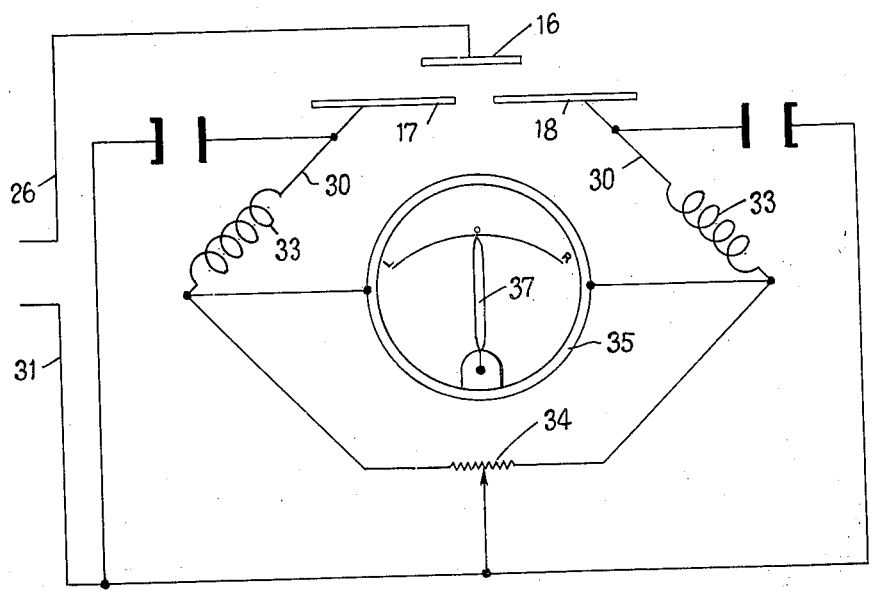

Patented Mar. 15, 1938

2,111,442

UNITED STATES PATENT OFFICE 2,111,442

NAVIGATING TELEMETERING SYSTEM

Francis West, Jr., Chilmark, Mass.

Application April 17, 1937, Serial No. 137,384

7 Claims. (Cl. 177—351)

The present invention relates to systems for use in navigating ships, planes, or other navigable craft, and the application is a continuation in part of my earlier application Serial Number 708,705, filed January 27, 1934.

An object of this invention is to provide a navigating system for use in steering a predetermined compass course, constructed and arranged to show when a ship or the like deviates from the desired compass course and to indicate the direction and extent of such deviation on an easily readable instrument capable of conveying the desired information at a glance, without requiring the close attention necessary in reading an ordinary compass card.

A further object is to provide a system of the type set forth constructed and arranged to permit a compass being placed at a distant point away from the bridge, cock-pit or the like, where it will not be affected by local magnetic influences, and to transmit to the navigator's post a definite indication of any change in the compass reading.

These and other objects which will be apparent to those skilled in the art are accomplished by the invention hereinafter described and illustrated in the accompanying drawings in which, Fig. 1 is a diagrammatic view showing one arrangement of apparatus illustrative of one embodiment of this invention;

Fig. 2 is a similar view showing a somewhat modified arrangement of part of the system shown in Fig. 1;

Fig. 3 is a diagram showing the provision of a capacity bridge in the arrangement of Fig. 1, and Fig. 4 is a partial sectional view showing certain mechanical details employed in the present invention.

The present invention provides a system for use in steering a predetermined compass course. It is of use in navigating any form of ship, plane, airship or the like, and the term "ship" herein employed is intended to cover any form of navigable craft. In general, it provides an electrical system in which a differential condenser is employed for maintaining a capacity bridge in balance so long as a predetermined course is being steered and for unbalancing such a bridge upon deviation from such course. Unbalancing of the bridge is employed to produce an actuating current through a suitably arranged current-responsive mechanism so that the predetermined course can be regained. More specifically the invention is intended to eliminate the necessity for a navigator carefully reading a compass card to determine if he is steering the desired course, and to substitute an easily read dial or the like which will instantly show at a brief glance whether or not the ship is on the desired compass course and, if not, indicate the direction and extent of any deviation. The system is adjustable according to the course to be steered and the arrangement is such that after adjustment it is only necessary to steer the ship in such a direction that an easily readable instrument such as a center zero meter, for example, gives a zero reading.

An illustrative embodiment of the invention is shown in Fig. 1 in connection with a magnetic compass which is illustrated as including a spherical bowl 10 having an azimuth ring 11 bearing the usual degree markings for cooperating with a lubber line 12 on the compass case 13 in which the bowl 10 and azimuth ring are rotatably supported for course-setting purposes. The compass bowl is filled with a so-called damping fluid which, in this invention, is also an effective dielectric as hereinafter brought out.

Usually, the magnetic element 14 of the compass actuates a compass card 15 having conventional compass markings. A condenser plate 16 is mounted for movement with the magnetic element as, for example, by supporting it adjacent the periphery of the card. The plate 16 is relatively small and of a very light metal such, for example, as aluminum so that it has no effect upon the inertia, damping, or period characteristics of the compass. The plate forms the movable plate of a variable condenser which also includes a pair of stationary plates 17 and 18, respectively, which are supported from and adjustable with the compass bowl 10. The plates 17 and 18 are spaced apart in the manner shown in Fig. 1 and cooperate with the relatively movable plate 16. All plates are perfectly concentric with the compass card so that all points on the movable plate 16 are always equidistant from the opposite points on the plates 17 and 18. Preferably, the plates are also formed on spherical surfaces as indicated in Fig. 4, so that no dipping of the card in the bowl will produce any capacity change in the electric circuits associated with the plates, but such capacity change will result only from movement of the magnetic element and the associated plate 16 in a substantially horizontal plane. This form of condenser is sometimes termed a "differential" condenser.

The condenser plates form part of a high frequency alternating current circuit which is provided with a substantially constant high frequency alternating current of, for example, 450 kilocycles from any suitable source such, for example, as an LC oscillator circuit 20 including the usual triode tube 21, inductively coupled coils 22, grid leak resistor 23, by-pass condenser 24 and source of plate current 25. Current of a constant high frequency is delivered to the condenser plates through line 26 extending through an insulator in the compass bowl to the compass pivot post 27 above an insulating section 27', thence through a conducting metallic jewel 28 and wire 29 to the movable condenser plate 16. Each relative stationary bowl-supported condenser plate 17 and 18 is connected through branch lines 30 and apparatus hereafter described including return line 31 to the oscillator circuit 20.

Means is provided for rectifying the alternating current in the branch lines 30 to direct current, and a direct current center zero meter such as a galvanometer is employed for measuring capacity variations in the separate branch lines produced by movement of the movable condenser plate 16 as a result of any deviation from a predetermined compass course. As illustrated, a double diode tube 32 is employed for this purpose by having its separate plates connected to one of each of the branch lines 30 and each cathode connected to the return line 31. Each plate circuit 30 includes a choke coil 33 and each circuit is connected through a potentiometer 34 to the return line 31. A direct current meter such as a center zero galvanometer 35 is connected across the plate circuits 30 and a variable resistance 36 is shunted across the galvanometer leads for varying the sensitivity of the meter.

It will be apparent that the adjustable condenser plates 17 and 18, the branch lines 30, potentiometer 34, and galvanometer 35 connected across the branch lines constitute an impedance capacity bridge which is diagrammatically indicated in Fig. 3. It will also be apparent that the double diode tube 32 operates as a half wave rectifier for each plate circuit 30, by-passing the positive half-cycle, for example, back to the oscillator circuit 20, but passing the negative half-cycle through the lines 30, choke coils 33 and potentiometer 34, the choke coils 33 serving to remove any remaining alternating current component. As a result, a direct current potential is established in each of the separate branch lines and differences in the relative capacities of the two branches will be indicated on the center zero galvanometer 35. The potentiometer 34 can be employed to set the meter to indicate zero for different relative positions of the condenser plates and thus ensure accuracy in the operation of the system by varying the relative resistances of the separate branch lines.

As pointed out above, the compass bowl 10 is filled with a fluid which not only operates as the usual compass damping fluid but which also is suitable as a dielectric between the condenser plates. A mineral oil such, for example, as a highly refined kerosene is generally employed.

In operation, the compass bowl is adjusted in accordance with the course which it is desired to follow. This may be accomplished by rotating the compass bowl in the frame 13 by hand, or any suitable mechanism can be provided for this purpose. For example, in Fig. 4, an adjusting mechanism is illustrated in which the compass bowl is provided with a gear 50 which may be rotated by a worm 51 operated through a flexible shaft 52 from a gear 53 operated by a knob 53' and connected to a course-set dial 55 which may be located at the navigator's position of the ship. The course-set dial is preferably provided with compass markings which indicate the compass course for which the apparatus is set. Rotation of the course-set dial rotates the compass bowl and locates the relatively stationary condenser plates 17 and 18 in a definite position corresponding to the course to be steered. In Fig. 1, for example, a compass course of due north is indicated. It will be apparent that by steering a course such as to maintain the movable plate 16, which is movable with the magnetic element of the compass, exactly between the plates 17 and 18, the condenser maintains the bridge in balance and the center zero meter 35 will point to zero just so long as the proper compass course is followed. However, any deviation from the desired course causes the magnetic element to shift and the associated condenser plate 16 shifts with it to one side or the other, thus unbalancing the bridge and causing the galvanometer needle 37 to move to one side or the other indicating the direction of such deviation as well as the extent thereof. The greater the deviation the greater the effect upon the capacity bridge and the greater the deflection of the needle 37. Likewise, the return to the desired course is shown on the meter. The operation of the latter is continuous and movement of the needle is proportional to deflection from the desired course.

It will be apparent that the compass itself can be placed away from the navigator's station and thus be free from local magnetic influences, having only the meter 35 at such station, together with the course-set dial 55 when the latter is provided.

Various modifications of the above described system will be apparent to those skilled in the art. For example, Fig. 2 illustrates diagrammatically a variation in which one double diode, triode tube 40 is employed in place of the two tubes shown in Fig. 1. In this case the single tube functions both as an oscillator for delivering a high frequency current to the condenser and also for rectifying the alternating current in the two sides of the bridge to provide direct current for the meter 35. The oscillator comprises inductively coupled coils 41, resistance 43, by-pass condenser 44, while the separate rectifying plates 45 are connected to the separate branch lines in the same manner as the plates of the single diode tube 32 shown in Fig. 1. The same choke coils 32 and potentiometer 34 are employed in this modification as in that shown in Fig. 1, and the operation and control of the system is the same.

It will be apparent that the invention can be further modified and adapted within the scope of the appended claims.

I claim:

1. An electrical system for use in navigation comprising in combination a compass, a source of high frequency current, an impedance capacity bridge including a variable condenser having a relatively movable condenser plate connected to said source of high frequency current and actuated by movement of said compass, and a plurality of cooperating relatively stationary condenser plates adjustable relatively to said movable condenser plate, and branch lines connected to said relatively stationary plates and to said source of high frequency current, a current-responsive mechanism connected across said branch lines, and means for setting the position of said relatively stationary condenser plates in accordance with a predetermined course to be steered whereby said condenser maintains said bridge in balance when said course is being steered and unbalances said bridge upon any deviation from said course to produce an actuating current through said mechanism.

2. An electrical system for use in navigation comprising in combination a compass, a source of high frequency current, an impedance capacity bridge including a variable condenser having a relatively movable condenser plate connected to said source of high equency current and actuated by movement of said compass, and a plurality of cooperating relatively stationary condenser plates adjustable relatively to said movable condenser plate, branch lines connected to said relatively stationary plates and to said source of high frequency current, a current-responsive mechanism connected across said branch lines, means actuated by said high frequency current for establishing direct current in said branch lines, and means for setting the position of said relatively stationary condenser plates in accordance with a predetermined course to be steered whereby said condenser maintains said bridge in balance when said course is being steered and unbalances said bridge upon any deviation from said course to produce an actuating current through said mechanism.

3. An electrical system for use in navigation comprising in combination a magnetic compass including a compass bowl, a magnetic element, and a damping fluid in said bowl forming a dielectric, a source of high frequency current, an impedance capacity bridge including a variable condenser having a relatively movable condenser plate in said bowl connected to said source of high frequency current and actuated by movement of said magnetic element, and a plurality of cooperating relatively stationary condenser plates in said bowl adjustable relatively to said movable condenser plate, branch lines connected to said relatively stationary plates and to said source of high frequency current, a current-responsive mechanism connected across said branch circuits, and means for setting the position of said relatively stationary condenser plates in accordance with a predetermined course to be steered whereby said condenser maintains said bridge in balance when said course is being steered and unbalances said bridge upon any deviation from said course to produce an actuating current through said mechanism.

4. An electrical system for use in navigation comprising in combination a magnetic compass including a compass bowl, a magnetic element, and a damping fluid in said bowl forming a dielectric, a source of high frequency current, an impedance capacity bridge including a variable condenser having a relatively movable condenser plate in said bowl connected to said source of high frequency current and actuated by movement of said magnetic element, and a plurality of cooperating relatively stationary condenser plates in said bowl adjustable relatively to said movable condenser plate, branch lines connected to said relatively stationary plates and to said source of high frequency current, a current-responsive mechanism connected across said branch lines, means actuated by said high frequency current for establishing direct current in said branch lines, and means for setting the position of said relatively stationary plates in accordance with a predetermined course to be steered whereby said condenser maintains said bridge in balance when said course is being steered and unbalances said bridge upon any deviation from said course to produce an actuating current through said mechanism.

5. An electrical system for use in navigation comprising in combination a magnetic compass including a compass bowl, a magnetic element, and a damping fluid in said bowl forming a dielectric, a source of high frequency current, an impedance capacity bridge including a variable condenser having a relatively movable condenser plate in said bowl connected to said source of high frequency current and actuated by movement of said magnetic element, and a plurality of cooperating relatively stationary condenser plates in said bowl adjustable relatively to said movable condenser plate, branch lines connected to said relatively stationary plates and to said source of high frequency current, a center zero meter connected across said branch lines, means actuated by said high frequency current to establish direct current in said branch lines, and means for setting the position of said relatively stationary condenser plates in accordance with a predetermined course to be steered whereby said condenser maintains said bridge in balance when said course is being steered and unbalances said bridge upon any deviation from said course to cause said meter to indicate the direction and extent of said deviation.

6. An electrical system for use in navigation comprising in combination a magnetic compass including a compass bowl, a magnetic element, and a damping fluid in said bowl forming a dielectric, a source of high frequency current, an impedance capacity bridge including a variable condenser having a relatively movable condenser plate in said bowl connected to said source of high frequency current and actuated by movement of said magnetic element, and a plurality of cooperating relatively stationary condenser plates in said bowl adjustable relatively to said movable condenser plate, branch lines connected to said relatively stationary plates and to said source of high frequency current, a center zero meter connected across said branch lines, means actuated by said high frequency current to establish direct current in said branch lines, means for setting the position of said relatively stationary condenser plates in accordance with a predetermined course to be steered whereby said condenser maintains said bridge in balance when said course is being steered and unbalances said bridge upon any deviation from said course to cause said meter to indicate the direction and extent of said deviation, and means for setting said meter to indicate zero for different relative positions of said condenser plates.

7. An electrical system for use in navigation comprising in combination a magnetic compass including a compass bowl, a magnetic element, and a damping fluid in said bowl forming a dielectric, a source of high frequency current, an impedance capacity bridge including a variable condenser having a relatively movable condenser plate located in said bowl, connected to said source of high frequency current and actuated by movement of said magnetic element, and a pair of cooperating relatively stationary condenser plates in said bowl adjustable relatively to said movable condenser plate, branch lines connected to said relatively stationary plates and to said source of high frequency current, a direct current meter connected across said branch lines, means actuated by said high frequency current for establishing direct current in said branch lines, and means for setting the position of said relatively stationary plates in accordance with a predetermined course to be steered whereby said condenser maintains said bridge in balance when said course is being steered and unbalances said bridge upon any deviation from said course to cause said meter to indicate the direction and extent of such deviation.

FRANCIS WEST, Jr.